(12) United States Patent
Milenkovic

(10) Patent No.: US 9,948,347 B2
(45) Date of Patent: Apr. 17, 2018

(54) CALIBRATING A TRANSCEIVER CIRCUIT

(71) Applicant: Lime Microsystems Ltd, Guildford, Surrey (GB)

(72) Inventor: Srdjan Milenkovic, Guildford (GB)

(73) Assignee: LIME MICROSYSTEMS LTD., Surrey (GB)

( * ) Notice: Subject to any disclaimer, the term of this patent is extended or adjusted under 35 U.S.C. 154(b) by 0 days.

(21) Appl. No.: 14/751,439

(22) Filed: Jun. 26, 2015

(65) Prior Publication Data
US 2015/0381228 A1 Dec. 31, 2015

(30) Foreign Application Priority Data

Jun. 26, 2014 (GB) .................... 1411369.0

(51) Int. Cl.
| | |
|---|---|
| H04B 1/38 | (2015.01) |
| H04L 5/16 | (2006.01) |
| H04B 1/40 | (2015.01) |
| H04B 17/11 | (2015.01) |
| H04B 17/21 | (2015.01) |
| H04B 17/12 | (2015.01) |
| H04B 17/00 | (2015.01) |

(52) U.S. Cl.
CPC ............. *H04B 1/40* (2013.01); *H04B 17/11* (2015.01); *H04B 17/12* (2015.01); *H04B 17/21* (2015.01); *H04B 17/0085* (2013.01)

(58) Field of Classification Search
CPC .......... H04B 1/40; H04B 17/11; H04B 17/12; H04B 17/21
See application file for complete search history.

(56) References Cited

U.S. PATENT DOCUMENTS

| | | | | |
|---|---|---|---|---|
| 5,724,653 A | * | 3/1998 | Baker | H03D 3/008 |
| | | | | 375/319 |
| 2004/0203548 A1 | * | 10/2004 | Kim | H04B 1/525 |
| | | | | 455/226.1 |
| 2008/0303714 A1 | * | 12/2008 | Ezal | G01C 21/005 |
| | | | | 342/357.22 |
| 2012/0257656 A1 | * | 10/2012 | Kang | H04B 1/525 |
| | | | | 375/221 |

FOREIGN PATENT DOCUMENTS

WO 2012094218 A1 7/2012

* cited by examiner

*Primary Examiner* — Wednel Cadeau
(74) *Attorney, Agent, or Firm* — William J. Clemens; Shumaker, Loop & Kendrick, LLP

(57) ABSTRACT

A method of calibrating a transceiver circuit including transmission circuitry for processing an input signal to produce an output signal including the input signal modulated onto a carrier signal, and reception circuitry arranged to take a modulated signal including a signal modulated onto a carrier signal and to output the signal demodulated from the carrier signal. The method includes: selectively coupling the transmission circuitry to the reception circuitry; introducing a reference signal into the transmission circuitry, the reference signal causing a plurality of components of different frequencies to be present in a calibration signal in the reception circuitry; measuring the power, and typically the received signal strength indication (RSSI) of the calibration signal including the plurality of components; and adjusting operation of the transmission and reception circuitry to increase the amplitude of a first set of the components relative to the amplitude of a second set of the components.

22 Claims, 8 Drawing Sheets

CALIBRATING A TRANSCEIVER CIRCUIT

FIELD OF THE INVENTION

This invention relates to a method of calibrating a transceiver circuit and to a transceiver circuit.

BACKGROUND OF THE INVENTION

The proliferation of mobile communication devices including smart phones, notepads and laptops has resulted in significant efforts for efficient wireless transmission through adoption of new standards, hardware improvements and more sophisticated network management. As a result, there has been an ever increasing pressure to reduce cost, size and power consumption of such systems. This has driven designers to develop transceivers with higher levels of integration with much of the work focused on replacing the external components with integrated counterparts. This is not a trivial matter and often necessitates design of completely new transceiver architectures to achieve fewer off chip components.

On the other hand, there is a very high demand for performance from the modern integrated transceivers in order to achieve high modulation orders and hence to fulfill the high data rates driven by today's wireless and mobile applications. In this respect, the transceivers are required to provide an exceptionally good noise figure performance, linearity, matching, IQ (in-phase/quadrature) phase/gain balance and radio frequency (RF) local oscillator (LO) phase noise performance. While the latter is determined by the performance of the synthesizer circuit, the rest of the parameters are dependent on the components used within the transmit and receive chains.

Given the emphasis on integration and low cost, there is a major push for the adoption of, for example, sub-micron CMOS technology for the implementation of transceiver technology. The key characteristic of the technology is the low cost for implementing the digital functions but poor analogue and RF performance compared with other specialized technologies. Hence any use of digital functions in CMOS for improving the transceiver performance is very desirable and enables the use of the technology in high data rate wireless communication systems.

BRIEF SUMMARY OF THE INVENTION

According to a first aspect of the invention, there is provided a method of calibrating a transceiver circuit, the circuit comprising transmission circuitry arranged to take at an input an input signal and to process the input signal so as to produce at an output an output signal comprising the input signal modulated onto a carrier signal; and reception circuitry arranged to take at an input a modulated signal comprising a signal modulated onto a carrier signal and to output at an output the signal demodulated from the carrier signal, in which the method comprises:
 selectively coupling the transmission circuitry to the reception circuitry;
 introducing a reference signal into the transmission circuitry, the reference signal causing a plurality of components of different frequencies to be present in a calibration signal in the reception circuitry;
 measuring the power of the calibration signal including the plurality of components; and
 adjusting the operation of the transmission and reception circuitry so as to increase the amplitude of a first set of components comprising at least one of the components relative to the amplitude of a second set of the components comprising at least one of the components.

As such, rather than having to measure the power distribution within the calibration signal, a simple single measure of power can be taken for the whole measurement. This can then be used to calibrate the operation of the circuit. Typically, there will be no need to determine the distribution of the power over frequency.

The step of introducing the reference signal may comprise introducing the reference signal at the input of the transmission circuitry. The power of the calibration signal may be measured at the output of the reception circuitry.

The transceiver circuit may comprise a signal source arranged to generate the reference signal, and so the step of introducing the reference signal may comprise introducing the reference signal using the signal source. The signal source may be a numerically controlled oscillator.

The transmission circuitry may comprise a transmission local oscillator arranged to produce a transmission local oscillator signal and a transmission mixer having inputs for the transmission local oscillator signal and the input signal and an output and being arranged to mix the signals at its input and output a mixed signal at its output. Similarly, the reception circuitry may comprise a reception local oscillator arranged to produce a reception local oscillator signal and a reception mixer having inputs for the reception local oscillator signal and the modulated signal and an output and being arranged to mix the signals at its input and output a mixed signal at its output.

The step of coupling the transmission circuitry to the reception circuitry may comprise introducing the mixed signal output by the transmission mixer as the modulated signal of the reception circuitry. Typically, the transceiver may comprise a switch that selectively couples the mixed signal output by the transmission mixer to one of the inputs of the reception mixer. The method may comprise amplifying the mixed signal output by the transmission mixer before introducing it to the reception mixer; typically, the amplification would occur in a low noise amplifier of the transmission circuitry. The reception circuitry may comprise a further low noise amplifier coupled to one of the inputs of the reception mixer, which is not used to amplify the mixed signal output from the transmission mixer.

In such a case, the calibration signal may comprise a first component representing the reference signal which has been increased in frequency by the transmission local oscillator signal and decreased in frequency by the reception local oscillator signal. The frequency of the first component can therefore be seen to be a sum of the frequencies of the reference signal and the transmission local oscillator signal, less the frequency of the reception local oscillator signal. Thus, the first component may be a member of the first set of components.

The calibration signal may also comprise a second component, which represents leakage of the transmission local oscillator signal and of any DC offset of the transmission circuitry. As such, any DC leakage will have been increased in frequency by the transmission local oscillator signal (where it is joined by any transmission local oscillator leakage) and then down converted by the reception local oscillator. As such, the frequency of the second component may be a difference in frequencies between the transmission and reception local oscillator signals. The second component may be a member of the second set of components.

The calibration signal may comprise a third component, which is present at a frequency which is the difference in frequency between the transmission and reception local oscillator signals, less the reference frequency. This occurs due to phase (or "IQ") imbalances in the transmission circuitry. The third component may be a member of the second set of calibration components.

The calibration signal may comprise a fourth component, at zero frequency (DC). This represents the DC offset of the reception circuitry and leakage of the reception local oscillator signal. The fourth component may be a member of the second set of calibration components.

Each of the components may have a corresponding component at negative frequency, due to phase/gain (or "IQ") imbalances in the reception circuitry. Each negative component is a member of the second set of calibration components.

The step of adjusting the operation of the transmission and reception circuitry may comprise configuring the circuit so that changing at least one variable of the transmission or reception circuitry causes at least one of the components to change in power relative to the other components, and then varying until an extreme, typically a minimum, in the measured power is reached. This step may comprise doing so several times, for different components. Each variable may be selected from the group comprising: the frequency of the transmission local oscillator, the frequency of the reception local oscillator, the frequency of the reference signal and a pass band of a low pass filter, whether analogue or digital.

For example, in order to compensate for the presence of the fourth component, the transmission circuitry will not be coupled to the reception circuitry (the switch, if present, will be open). No signal will be applied to the input of the reception circuitry (which may be terminated appropriately). Thus, with no signal to be amplified, the only component of the calibration signal will be the fourth component, and so the measured power will be indicative of the presence of the fourth component. The reception circuitry can then be operated to minimize the power measurement and so the fourth component. In one embodiment, the reception circuitry will comprise at least one digital-to-analogue converter which outputs a DC bias, typically as part of a variable gain amplifier that acts upon the output of the reception mixer; the variable to be modified will then be the DC bias.

In another example, which would typically occur after the example immediately above, the transmission local oscillator signal would be set to a first frequency and the reception local oscillator signal would be set to a second frequency less than the first frequency (although potentially only by a few megahertz, say less than 5 MHz), the transmission circuitry would be coupled to the reception circuitry and the reference signal set to zero frequency (DC). Minimizing the measured power will therefore reduce the negative frequency equivalent of the second component, and so also the second component.

In yet another example, which would typically occur after the example immediately above, the transmission local oscillator signal would be set to a first frequency and the reception local oscillator signal would be set to a second frequency less than the first frequency (although potentially only by a few megahertz, say less than 5 MHz), the transmission circuitry would be coupled to the reception circuitry and the reference signal set to a frequency greater than the difference between the frequencies of the transmission and reception local oscillator signals. Thus, adjusting the response of the transmission circuitry to different phase signals, and the relative gain of differently phased signals (that is, phase and gain correction) can be used to minimise the measured power; this will have the effect of reducing the third component.

In a further example, the reception circuitry also has a signal generator arranged to generate a reception reference signal, which is mixed with the calibration signal, the power of the calibration signal being measured after the mixing with the reception reference signal. Furthermore, the reception circuitry may comprise a decimation filter, which acts on the calibration signal after it has been mixed with the reception reference signal, the decimation filter having a passband; typically this will be symmetrical about zero frequency. In this example, the reception reference signal can be used to shift the mixed calibration signal in frequency before passing through the decimation filter. As such, whereas the first component and its negative component would otherwise be symmetric about zero frequency, by shifting the frequency, it is possible to include the negative component corresponding to the first component fall within the passband of the decimation filter and so contribute to the power being measured, but with the first component outside of the passband and so not contributing to the power. Therefore, by adjusting the gain and phase correction components of the reception circuitry, the negative component corresponding to the first component can be reduced.

According to a second aspect of the invention, there is provided a transceiver circuit, comprising transmission circuitry arranged to take at an input an input signal and to process the input signal so as to produce at an output an output signal comprising the input signal modulated onto a carrier signal; and reception circuitry arranged to take at an input a modulated signal comprising a signal modulated onto a carrier signal and to output at an output the signal demodulated from the carrier signal, in which the circuit further comprises:

a switch arranged to selectively couple the transmission circuitry to the reception circuitry;

a reference signal source arranged to introduce a reference signal into the transmission circuitry, the reference signal causing a plurality of components of different frequencies to be present in a calibration signal in the reception circuitry; and power measurement circuitry arranged to measure the power of the calibration signal including the plurality of components.

As such, rather than having to measure the power distribution within the calibration signal, a simple single measure of power can be taken for the whole measurement. This can then be used to calibrate the operation of the circuit. The circuit may not comprise a circuit which is arranged to determine the distribution of the power of the calibration signal over frequency.

The reference signal may be introduced at the input of the transmission circuitry. The power of the calibration signal may be measured at the output of the reception circuitry.

Typically, the signal source will be a numerically controlled oscillator. This is a particularly convenient method of carrying out the calibration of the circuit, particularly as described in the first aspect of the invention.

The transmission circuitry may comprise a transmission local oscillator arranged to produce a transmission local oscillator signal and a transmission mixer having inputs for the transmission local oscillator signal and the input signal and an output and being arranged to mix the signals at its input and output a mixed signal at its output. Similarly, the reception circuitry may comprise a reception local oscillator arranged to produce a reception local oscillator signal and a reception mixer having inputs for the reception local oscillator signal and the modulated signal and an output and being arranged to mix the signals at its input and output a mixed signal at its output.

Typically, the switch may selectively couple the mixed signal output by the transmission mixer to one of the inputs of the reception mixer. The transmission circuitry may further comprise an amplifier (typically a low noise amplifier) arranged to amplify the mixed signal output by the transmission mixer before introducing it to the reception mixer. The reception circuitry may also comprise a further amplifier (typically a low noise amplifier) coupled to one of the inputs of the reception mixer, which is not used to amplify the mixed signal output from the transmission mixer.

The reception circuitry may also have a signal generator arranged to generate a reception reference signal, which is mixed with the calibration signal, the power measurement circuitry being arranged so as to measure the power of the calibration after the mixing with the reception reference signal. Furthermore, the reception circuitry may comprise a decimation filter, which acts on the calibration signal after it has been mixed with the reception reference signal, the decimation filter having a passband; typically this will be symmetrical about zero frequency. In this example, the reception reference signal can be used to shift the mixed calibration signal in frequency before passing through the decimation filter. As such, whereas the first component and its negative component would otherwise be symmetric around zero frequency, by shifting the frequency, it is possible to include the negative component corresponding to the first component fall within the passband of the decimation filter and so contribute to the power being measured, but with the first component outside of the passband and so not contributing to the power.

The circuit may comprise a controller, such as a microprocessor. Typically, this will be arranged to control the circuit so as to carry out the method of the first aspect of the invention.

BRIEF DESCRIPTION OF THE SEVERAL VIEWS OF THE DRAWINGS

There now follows, by way of example only, an embodiment of the invention, described with reference to the accompanying drawings, in which.

DETAILED DESCRIPTION OF THE INVENTION

Figure 1:
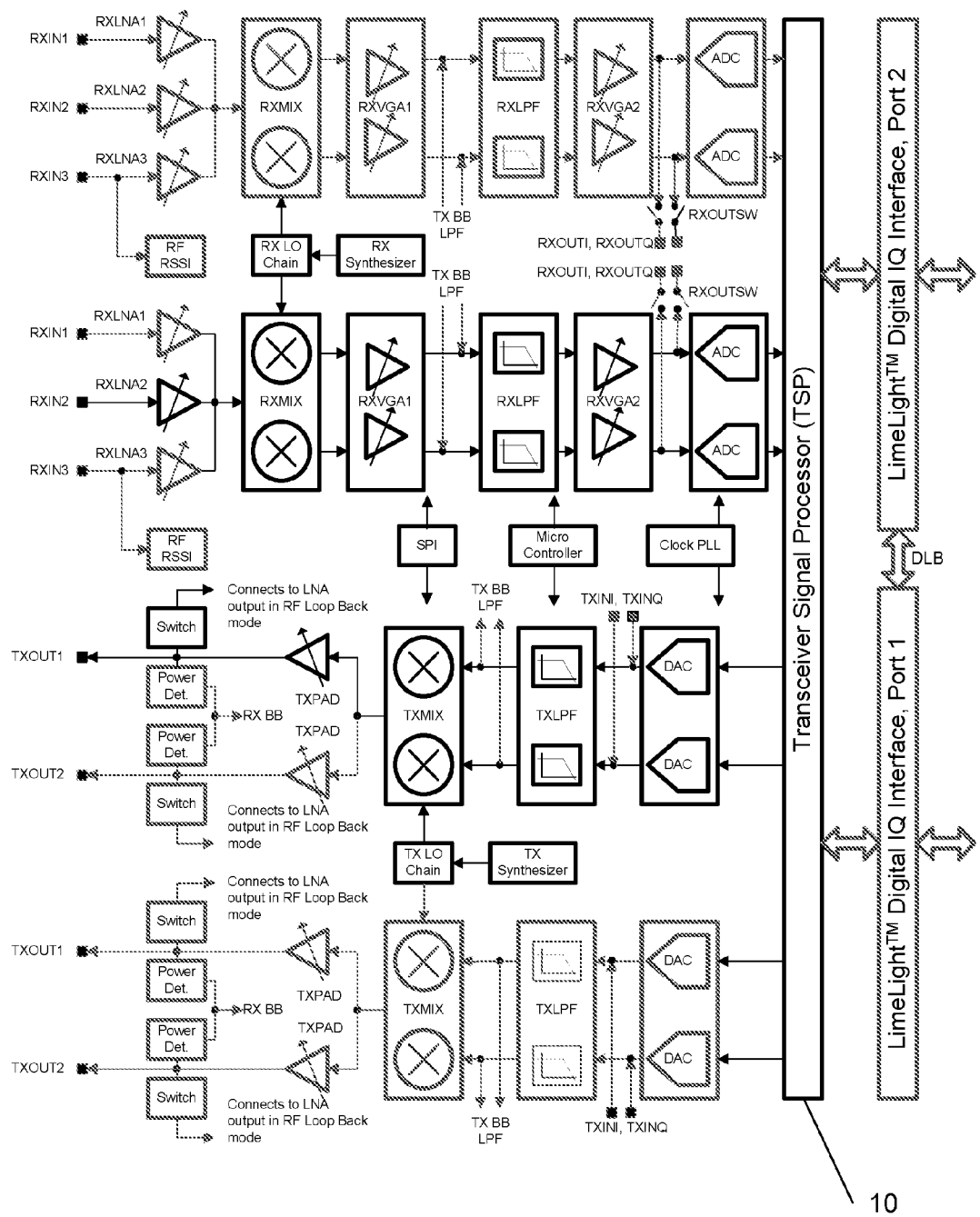
FIG. 1 shows an example transceiver circuit in accordance with an embodiment of the invention.
Figure 2:
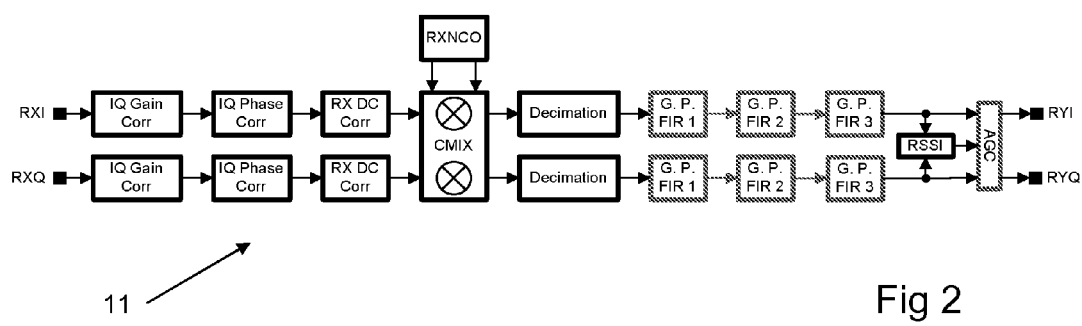
FIG. 2 shows the structure of the reception transceiver signal processor (TSP) of FIG. 1.
Figure 3:
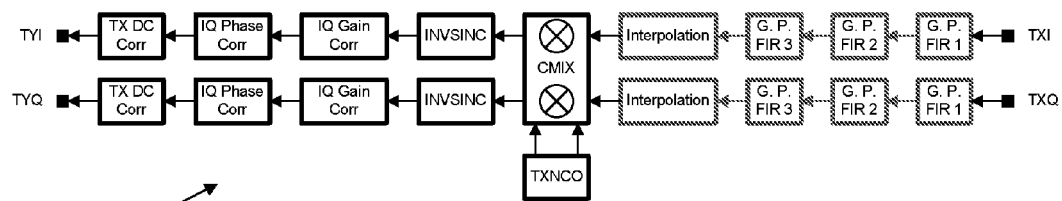
FIG. 3 shows the structure of the transmission transceiver signal processor (TSP) of FIG. 1.

A simplified block diagram of the key structure and blocks within a typical 2×2 MIMO (multiple input, multiple output) integrated transceiver, used as an example here, are shown in FIGS. 1 to 3, although calibration algorithms are applicable generally to any N×M MIMO and also to MO (single input, single output) transceivers. Note that the transceiver signal processor (TSP) 10 of FIG. 1 contains the RXTSP (reception TSP) 11 and TXTSP (transmission TSP) 12 of FIGS. 2 and 3, respectively. The digital IQ (in-phase/quadrature) interface is used to interface the transceiver to a baseband circuit where the received data is processed and/or data is supplied to the transmitter for the up conversion to a radio frequency (RF) signal.

Regarding FIG. 1, one complete RX (reception) chain and one TX (transmission) chain of the example 2×2 MIMO transceiver will be used in the algorithm explanation. Calibration of other TX/RX chains in N×M MIMO transceivers is exactly the same and will not be repeated here for clarity. Also, only one low noise amplifier (LNA) is active and will be used to calibrate RX DC offset and RX local oscillator (LO) leakage. RF loopback via switch 14 from the output of the TX chain to the input (post LNA) of the RX chain will be used during calibration hence only one TXPAD (TX power amplifier driver) and corresponding switch are left to construct TX to RX RF loopback. Whilst using RF loopback option all test signals are generated by on chip digital blocks (NCOs and digital filters) and key measurement block is digital received signal strength indicator (RSSI) which in fact measures received signal power. No external test equipment need be required for the calibration process.

On the RXTSP side, during calibration all General Purpose FIR (finite impulse response) filters are bypassed/powered down as well as digital AGC (adaptive gain control) block. FIR filters take longer to configure since there would be a need to upload a significant number of coefficients. Hence, the reason to use a decimation filter as discussed below which has fixed coefficients and there is only a need to change decimation ratio to change its pass band characteristics, if required. Similarly, the same applies for TXTSP block and there is no need for any digital filtering within TXTSP block so both general purpose FIR filers as well as interpolation filter are bypassed/powered down.

In this embodiment, test signals are generated by on chip NCOs (numerically controlled oscillators), a TX NCO 15 coupled to the input of the TX chain and a RX NCO 16 coupled to the output of the RX chain. The only measurement that is required is performed by digital RSSI. Having in mind that both baseband and on chip microcontroller can control NCOs and read RSSI means that both circuits can execute the calibration procedure. Of course, it is recommended to assign this to on chip microcontroller unit (MCU) 20 saving time and processing power of baseband processor to deal with other tasks.

Digital RSSI block 17 has embedded averaging filter where averaging window is programmable. Maximum averaging window size is 1024 clock cycles, in the case of this example. Averaging RSSI output improves the measurement accuracy. During calibration process all is required is to read RSSI output after averaging is completed.

Figure 4:
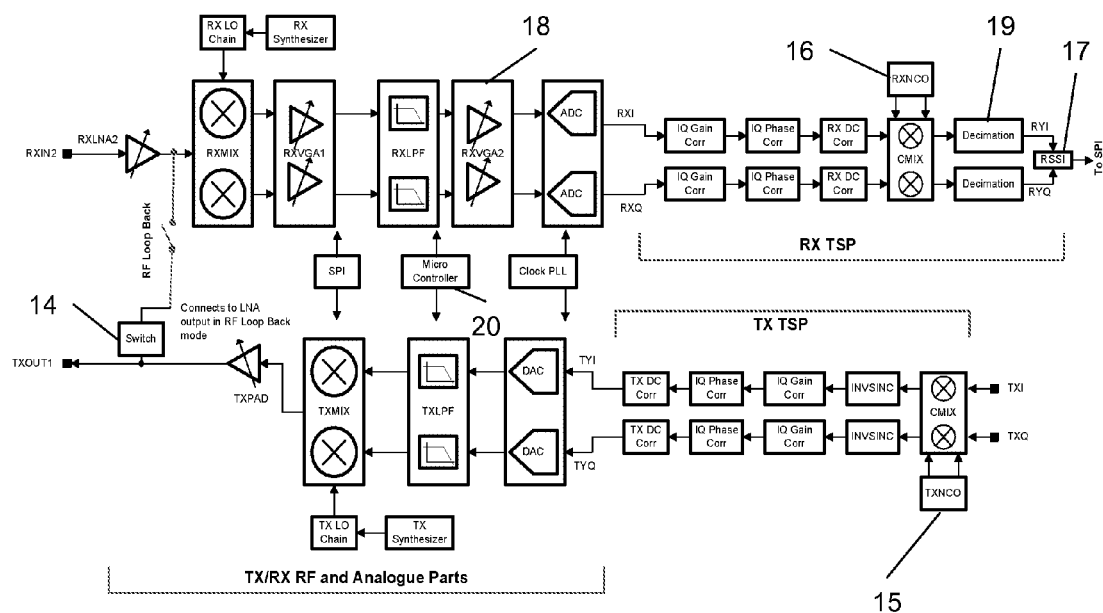
FIG. 4 shows the circuit of FIG. 1, configured for use in a method in accordance with the embodiment of the invention.

Taking now the circuit as shown in FIG. 4 (which shows a simplified block diagram of the transceiver without the blocks that are not used in calibration), the first step is to analyze the scenario with the following setup and/or algorithm:

Drive TXTSP with digital n-bit two' complement DC (12-bit in this example) i.e.
TXI=011111111111=+max 12-bit word
TXQ=100000000000=−max 12-bit word
This can be done through an internal test option, hence there is no need to engage digital IQ interface to connect to a baseband processor.
Bypass IQ Gain Correction, IQ Phase Correction and TX DC Correction TXTSP blocks. Keep INVERSE sine filter running.
Tune TX LPF (low pass filter) pass band/stop band to be able to filter DAC images which are consequence of zero hold effect of the DACs.
Tune TX Synthesizer to a frequency $f_{TXLO}$. Tune RX Synthesizer to $f_{RXLO}$ offset from $f_{TXLO}$ by few MHz and keep $f_{TXLO} > f_{RXLO}$.
Set TXPAD gain not to overload RX mixer.
Close RF Loopback switch 14.
Power down RXLNA2 (optional).
Set RXVGA1 (variable gain amplifier 1) (RXTIA transimpedance amplifier) and RXVGA2 (RXPGA—programmable gain amplifier) gain not to overload ADCs (analogue to digital converters).
Open RXLPF (low passband) pass band as much as possible to clearly see all tones generated in this setup.
Bypass IQ Gain Correction, IQ Phase Correction and RX DC Correction RXTSP blocks. Bypass Decimation filter to see all tones generated by the whole setup.
Set RXNCO 16 frequency to 0. Set TXNCO 15 to $f_{TXNCO}$ where $f_{TXLO} - f_{RXLO} > f_{TXNCO}$.

Figure 5:
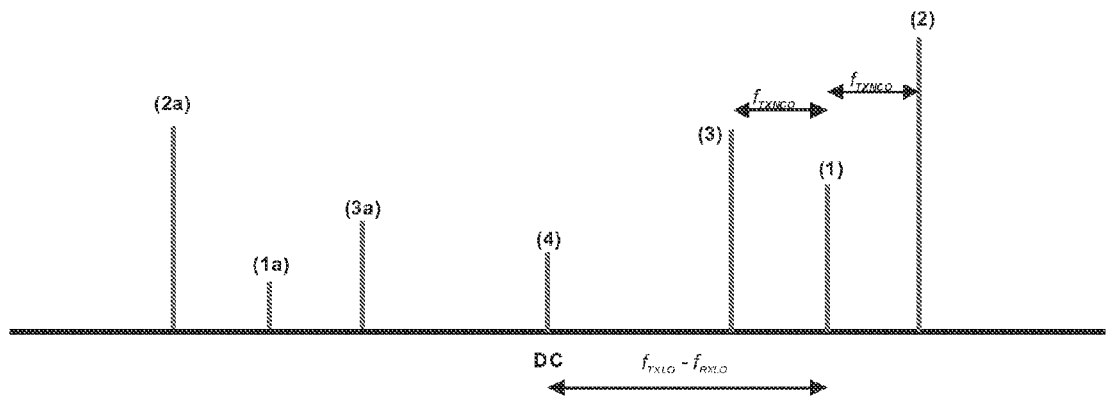
FIG. 5 shows a graph of power against frequency for the configuration of FIG. 4.

The test setup described above uses minimum filtering to clearly show unwanted tones to be cancelled or calibrated out. The spectrum of FIG. 5 shows RX output while the transceiver works in RF loopback mode (that is, with switch 17 closed). Tones and the reasons for their existence are given below:

(1) TX DC and TX LO leakage. It is down converted by $f_{RXLO}$ hence it appears in base band frequencies at $f_{TXLO} - f_{RXLO}$
(2) This is wanted TX sideband. Offset from TX LO leakage by TXNCO frequency $f_{TXNCO}$.
(3) Unwanted TX sideband caused by TX IQ imbalance.
(4) RX DC offset and RX LO leakage. Appears at DC.
(3a) RX unwanted side band caused by component (3).
(1a) RX unwanted side band caused by component (1).
(2a) RX unwanted side band caused by component (2).
Note that all tones at negative frequencies are the consequence of RX IQ imbalance.

FIG. 5 shows that a single measurement can capture all the tones that are required to be cancelled. There are two problems with this approach. There would be a need to perform complex fast Fourier transform (FFT) which is computationally intensive i.e. takes a long time to execute and the circuitry for FFT is complex and power hungry. The novel approach proposed here is to use digital RSSI for measurement instead of FFT. RSSI can accurately measure only the power for a given spectrum and does not distinguish between multiple tones as in FIG. 5. However, by carefully choosing the order of calibration steps and with the help of digital filters and/or analogue LPFs as well as the Transmitter NCO (TXNCO) and Receiver NCO (RXNCO) this is possible, as detailed in the next sections.

Figure 6:
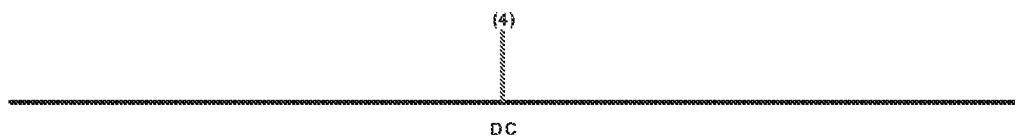
FIG. 6 shows a graph of power against frequency for the configuration of FIG. 4, at the start of a first calibration step.

For the RX DC offset and RX LO leakage calibration, the TX setup is not relevant. Hence, the following algorithm is presented for the RX only:

Tune RX LO Synthesizer to $f_{RXLO}$ system target frequency.
Open RF Loopback switch 14.
Keep RXLNA2 powered up to take into account RX LO leakage which may happen through RXLNA2 path. It is recommended to terminate LNA inputs with 50 Ohm in this example to minimize the noise which LNA can pick up through open inputs.
Set RXVGA1 (RXTIA) and RXVGA2 (RXPGA) gain not to overload ADCs.
RXLPF set up is not critical since DC is being measured.
Bypass IQ Gain Correction, IQ Phase Correction and RX DC Correction RXTSP blocks. Bypass Decimation filter.
Set RXNCO frequency to 0.
RSSI measures the level of DC as shown in FIG. 6. There are two options to minimize DC and LO leakage.

Figure 7:
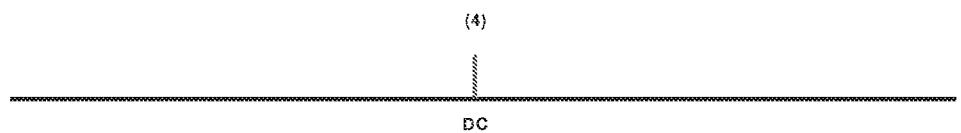
FIG. 7 shows an equivalent graph to that of FIG. 6, after initial correction.

First, one can use DC compensation DACs (digital to analogue converters) that are typically available in RXVGA1 (RXTIA) 18 and alter the values to minimize RSSI output. This will reduce DC as shown in FIG. 7.

Figure 8:
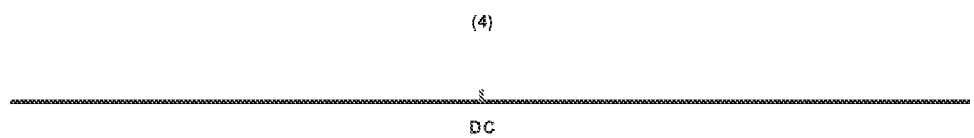
FIG. 8 shows an equivalent graph to that of FIG. 7, after further correction.

There will be some residual DC due to limited resolution of on chip DC compensation DACs. This can be further improved by enabling RX DC cancelation loop in RXTSP. The loop is running all the time so it can track and correct any RX DC offset which may be caused by changing RX LO frequency, RF input signal level due to IP2 and temperature drift. A small residual DC will still be there due to LSB resolution of n-bit ADCs (12-bit considered in this example transceiver). After correcting for this, the DC component 4 can be seen to be reduced as shown in FIG. 8.

The setup is now presented to have only TX DC Offset and TX LO leakage tone. This can be achieved as follows.

Bypass IQ Gain Correction, IQ Phase Correction TXTSP blocks. Keep INVERSE sine filter and TX DC Correction block running.
Tune TX Synthesizer to $f_{TXLO}$. Tune RX Synthesizer to $f_{RXLO}$ offset from $f_{TXLO}$ by few MHz and keep $f_{TXLO} > f_{RXLO}$.
Set TXPAD gain not to overload RX mixer.
Close RF Loopback switch 14.
Power down RXLNA2 (optional).
Set RXVGA1 (RXTIA) and RXVGA2 (RXPGA) gain not to overload ADCs.
Open RXLPF pass band as much as possible to clearly see TX DC offset and TX LO leakage tone.
Bypass IQ Gain Correction, IQ Phase Correction and Decimation filter RXTSP blocks.
Keep RXVGA1 (RXTIA) DC offset DAC values determined above. Keep RX DC cancelation loop running. This should keep DC at the level as shown above.
Set RXNCO frequency to 0. Set TXNCO frequency to 0.

Figure 9:
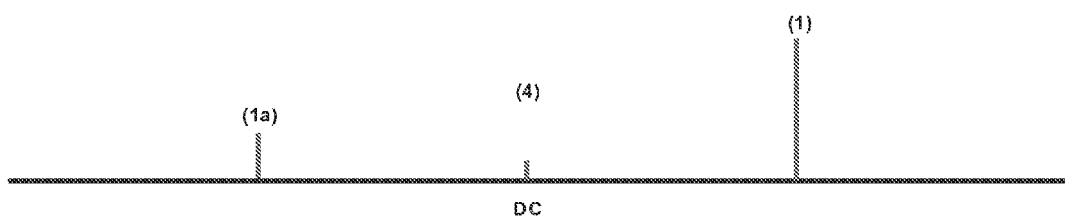
FIG. 9 shows an equivalent graph to that of FIG. 5, at the start of a second calibration step.

Spectrum driving RSSI is shown in FIG. 9. In fact RSSI measures the level of two tone signal. However tones are correlated i.e. (1a) is unwanted side band while (1) is wanted side band. (1a) is due to RX IQ imbalance. In other words, minimizing (1) tone (1a) will go down by the same amount. RSSI output will be composite power level of those two tones and is a valid measure. If RSSI output is minimized then TX DC offset and TX LO leakage are minimized, disregarding the presence of two (correlated) tones.

Figure 10:
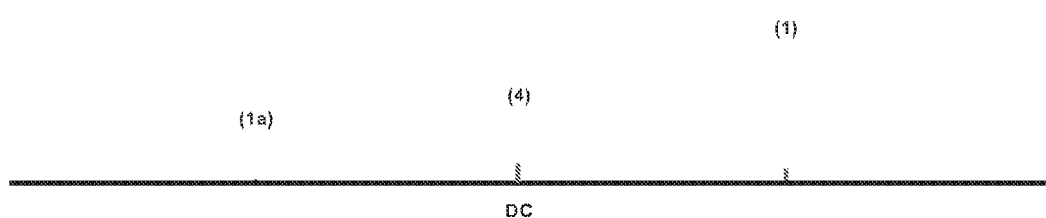
FIG. 10 shows an equivalent graph to that of FIG. 9, after correction.

In order to do so, we first alter set up of on chip DC calibration DACs if available to minimize RSSI output. Then alter TX IQ DC correction TXTSP block parameters to minimize RSSI output i.e. to further minimize residual TX DC offset and TX LO leakage. An example spectrum after this calibration is shown in FIG. 10 of the accompanying drawings. It is important to note that component (1a) will probably disappear into measurement noise floor as it is lower level than (1) and since it is possible to reduce (1) by a significant amount, (1a) goes down for the same amount, hence hitting the measurement noise floor.

Figure 11:
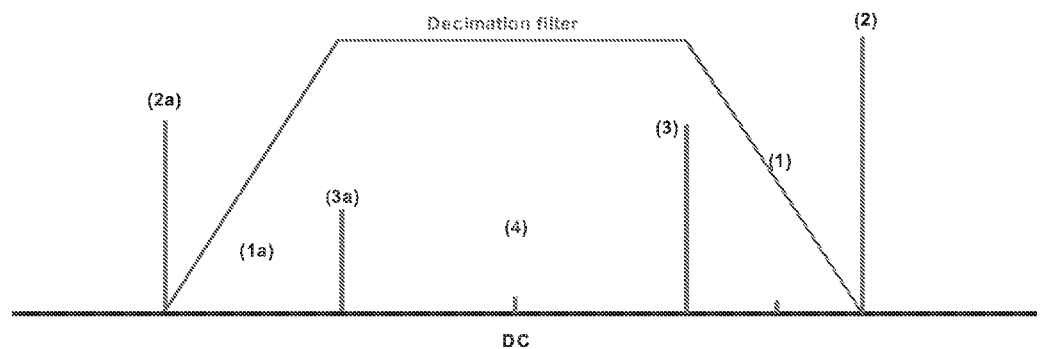
FIG. 11 shows an equivalent graph to that of FIG. 5, at the start of a third calibration step.

In order to correct for any errors in TX IQ gain and phase error calibration, there will be four tones however not all are related, see FIG. 11. For example tones 2 and 2a are correlated as well as tones 3 and 3a. However 2 and 3 are not. The goal of this calibration is to minimize tone 3 keeping tone 2 untouched. Tone 2 will introduce an error in RSSI measurement so some filtering will be required. The setup can be as described below.

Keep the blocks used above active and program them with calibration values obtained so far.
Drive TXTSP with digital n-bit (12-bit in this example circuit) two's complement DC i.e.
TXI=011111111111=+max 12-bit word
TXQ=10000000000=−max 12-bit word
This can be done through a test option, no need to engage digital IQ interface for the assistance of a baseband
Do not bypass IQ Gain Correction, IQ Phase Correction TXTSP blocks. TX DC Correction should be set with the parameters obtained as before. Keep INVERSE sine filter running.
Tune TX LPF pass band/stop band to be able to filter DAC images which are consequence of zero hold effect of the DACs.
Tune TX LO Synthesizer to $f_{TXLO}$. Tune RX LO Synthesizer to $f_{RXLO}$ offset from $f_{TXLO}$ by few MHz and keep $f_{TXLO} > f_{RXLO}$.
Set TXPAD gain not to overload RX mixer.
Close RF Loopback switch 14.
Power down RXLNA2 (optional).
Set RXVGA1 (RXTIA) and RXVGA2 (TXPGA) gain not to overload ADCs.
Open RXLPF pass band as much as possible to clearly see all tones generated in this setup.
Bypass IQ Gain Correction, IQ Phase Correction RXTSP blocks. Set Decimation filter decimation factor to 2 for the filter to provide some filtering. Decimation by 1 is in fact bypass i.e. no filtering at all.
Set RXNCO frequency to 0. Set TXNCO to $f_{TXNCO}$ where $f_{TXLO} - f_{RXLO} > f_{TXNCO}$.

Figure 12:
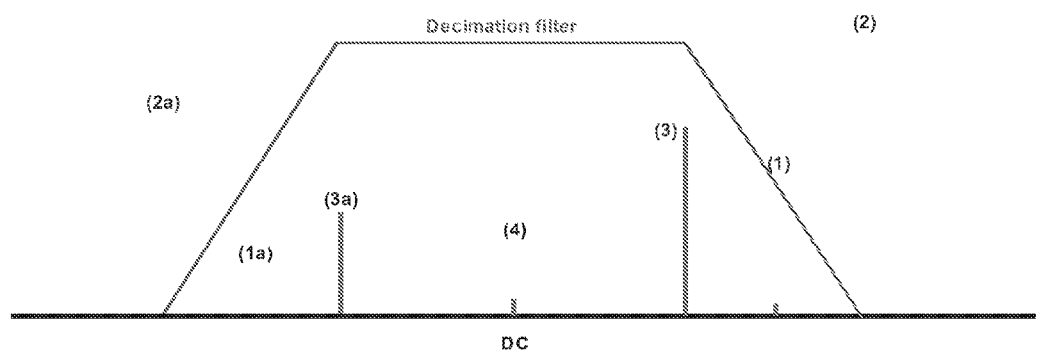
FIG. 12 shows an equivalent graph to that of FIG. 11, after initial correction.
Figure 13:
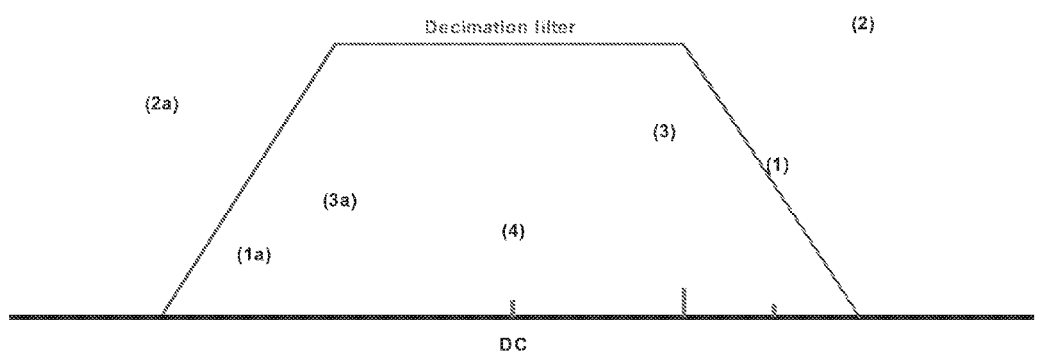
FIG. 13 shows an equivalent graph to that of FIG. 12, after further correction.

Decimation filter 19 has a passband shown in FIG. 11 that will cut off tones 2 and 2a, as shown in FIG. 12. This results in two tones 3 and 3a in the same way as above, so composite power that is measured by RSSI is a valid number to minimize to cancel TX unwanted signal 3 and 3a. Algorithm is similar as presented earlier. First alter on chip analog IQ phase/gain correction parameters, if available, to minimize RSSI output. This will be followed by altering TX Gain correction and TX Phase correction parameters of TXTSP digital block to further minimize RSSI output. Resulting spectrum is shown in FIG. 13.

In order to correct for any errors in RX IQ Gain and Phase Calibration, as far as RX IQ imbalance is concerned, there are two tones 2 and 2a. The purpose is to change RX IQ gain and RX phase correction parameters to minimize unwanted RX side band 2a while keeping wanted side band 2 unaffected. This means that 2 and 2a are not correlated as in the above sections. In fact minimizing 2a is not going to affect the level of 2. Some filtering is required here to filter out wanted side band 2 and to leave only unwanted 2a. Filtering can be achieved by RXNCO set to frequency shift tones 2a and 2 so 2a appears in pass band and tone 2 in stop band of the decimation filter 19. The setup for this calibration is as follows:

Drive TXTSP with digital n-bit (12-bit in this example) two' complement DC i.e.
TXI=011111111111=+max 12-bit word
TXQ=10000000000=−max 12-bit word
This can be done through the test option, no need to engage the baseband through the digital interface
At this point TX is fully calibrated. Keep all correction blocks running and programmed by parameters obtained so far.
Keep INVERSE sine filter running.
Tune TX LPF pass band/stop band to be able to filter DAC images which are consequence of zero hold effect of the DACs.
Tune TX LO Synthesizer to $f_{TXLO}$. Tune RX LO Synthesizer to $f_{RXLO}$ offset from $f_{TXLO}$ by few MHz and keep $f_{TXLO} > f_{RXLO}$.
Set TXPAD gain not to overload RX mixer.
Close RF Loopback switch 14.
Power down RXLNA2 (optional).
Set RXVGA1 (RXTIA) and RXVGA2 (RXPGA) gain not to overload ADCs.
Open RXLPF pass band as much as possible to clearly see all tones generated in this setup.
Activate IQ Gain Correction and IQ Phase Correction RXTSP blocks. Program analogue RX DC Correction block with the parameters obtained before. Keep digital RX DC cancelation loop running.
Set Decimation filter decimation factor to 2 for the filter to provide some filtering. Decimation by 1 is in fact bypass i.e. no filtering at all.
Set RXNCO frequency to shift RX unwanted side band (2a) into Decimation filter pass band. Set TXNCO frequency to $f_{TXNCO}$ where $f_{TXLO} - f_{RXLO} > f_{TXNCO}$.

Figure 14:
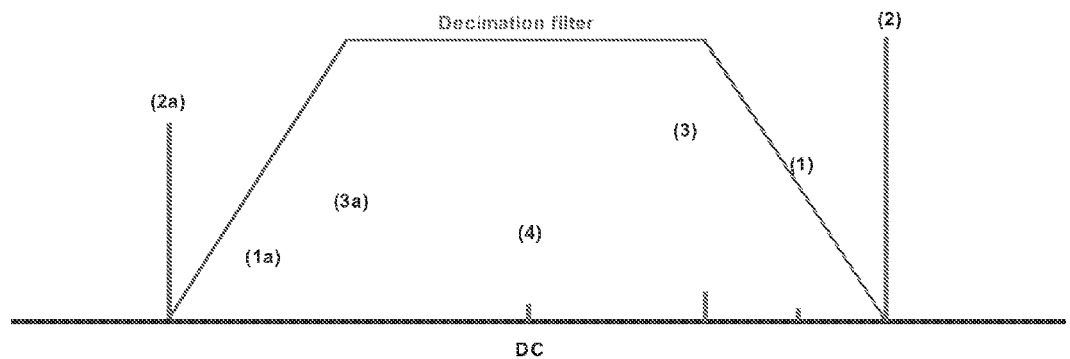
FIG. 14 shows an equivalent graph to that of FIG. 5, at the start of a fourth calibration step.
Figure 15:
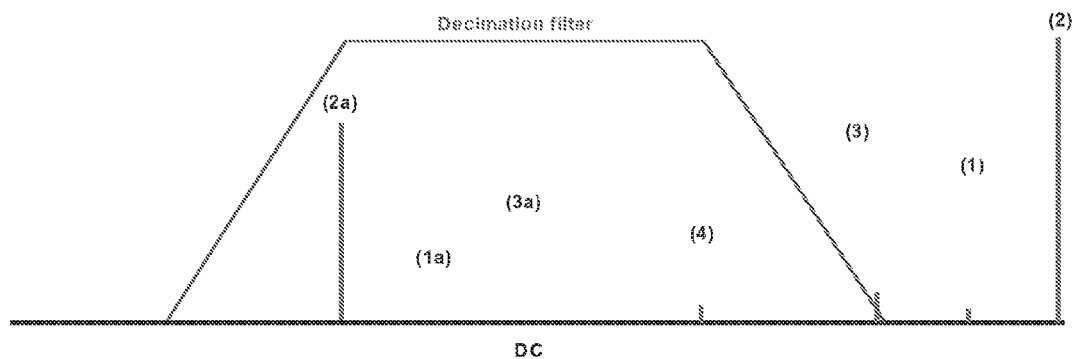
FIG. 15 shows an equivalent graph to that of FIG. 14, after initial processing.
Figure 16:
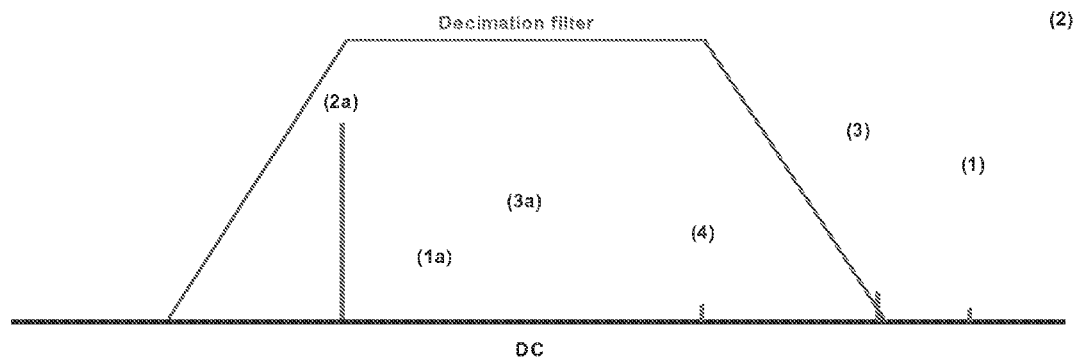
FIG. 16 shows an equivalent graph to that of FIG. 15 after further processing.
Figure 17:
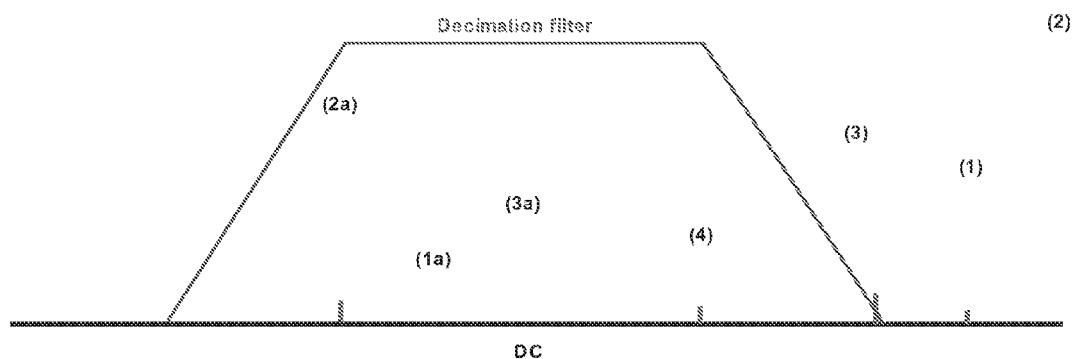
FIG. 17 shows an equivalent graph to that of FIG. 16 after yet further processing.

FIG. 14 shows the spectrum before the RXNCO causes a frequency shift, and FIG. 15 afterwards. It can be seen that tone 2 is now outside of the decimation filter 19 passband. After digital filtering by decimation filter 19 (FIG. 16), there is only one tone unwanted 2a and RSSI is able to measure its level accurately. Algorithm is similar as before. Alter on chip analogue IQ phase/gain correction parameters, if available, to minimize RSSI output. After that alter RX Gain and RX IQ Phase correction parameters of digital RXTSP to further minimize RSSI output. Resulting spectrum is shown in FIG. 17.

Figure 18:
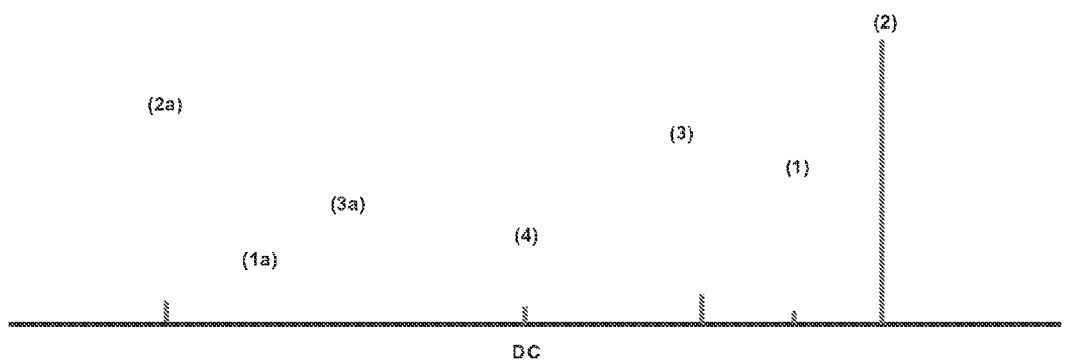
FIG. 18 shows an equivalent graph to that of FIG. 5, after calibration has been completed.

After frequency shifted back (RXNCO frequency set to 0) and bypassing. Decimation filter, FIG. 18 shows final spectrum of the calibrated chip. Essentially only wanted signal 2 is observed.

Due to Phase Frequency Detector (PFD) and Charge Pump (CHP) 'dead zone' i.e. nonlinearity around zero, fractional-N PLLs used in transceivers are prone to generate unwanted spurs when set close to integer-N frequency. These spurs are in the loop pass band and cannot be filtered. A generally adopted solution is to set a constant charge pump current offset to shift PFD/CHP away from zero i.e. operating them into a more linear region. However, this CHP offset value usually depends how far the PLL output frequency is away from the nearest integer frequency and has to be tuned accordingly. This is cumbersome and prone to errors.

On both TX and RX sides, NCO could be used to improve close to integer PLL spurs as follows.

Set charge pump offset current to some middle value and keep it constant disregarding how close to integer frequency target LO is.

Offset PLL (LO) wanted frequency away from integer frequency by $f_{offset}$ far enough not to have close to integer spurs.

This introduces PLL output frequency error which can be corrected by setting corresponding NCO to produce $-f_{offset}$ frequency. In other words the NCO's ability in providing highly accurate frequencies in digital domain could be utilised in producing the required offset frequency to minimize the total frequency error of the system by compensation for the PLL error.

The invention claimed is:

1. A method of calibrating a transceiver circuit, the circuit comprising transmission circuitry arranged to take at a transmitter input an input signal and to process the input signal so as to produce at a transmitter output an output signal comprising the input signal modulated onto a carrier signal; and reception circuitry arranged to take at a receiver input a modulated signal comprising a signal modulated onto a carrier signal and to output at a receiver output the signal demodulated from the carrier signal, in which the method comprises:

selectively coupling the transmission circuitry to the reception circuitry;

introducing a reference signal into the transmission circuitry, the reference signal causing a plurality of components of different frequencies to be present in a calibration signal in the reception circuitry;

measuring the power of the calibration signal including the plurality of components; and adjusting the operation of the transmission and reception circuitry so as to increase the amplitude of a first set of components comprising at least one of the plurality of components relative to the amplitude of a second set of the components comprising at least one of the plurality of components;

in which the following steps are carried out:

a) a transmission local oscillator signal is set to a first frequency and the reception local oscillator signal is set to a second frequency less than the first frequency, the transmission circuitry being coupled to the reception circuitry and the reference signal is set to zero frequency; the method comprising minimizing the measured power so as to reduce at least one of a component having a frequency being a difference in frequencies between the transmission and reception local oscillator signals and a negative frequency equivalent of the component having a frequency being a difference in frequencies between the transmission and reception local oscillator signals, the component having a frequency being a difference in frequencies between the transmission and reception local oscillator signals being a member of the second set of components;

b) a transmission local oscillator signal is set to a first frequency and a reception local oscillator signal is set to a second frequency less than the first frequency, the transmission circuitry is coupled to the reception circuitry and the reference signal is set to a frequency greater than the difference between the frequencies of the transmission and reception local oscillator signals; the method comprising adjusting the response of the transmission circuitry to different phase signals and the relative gain of differently phased signals to minimize the measured power so as to reduce a component having a frequency which is the difference in frequency between the transmission and reception local oscillator signals, less the reference frequency, the component having a frequency which is the difference in frequency between the transmission and reception local oscillator signals, less the reference frequency being a member of the second set of calibration components;

c) the reception circuitry has a signal generator arranged to generate a reception reference signal, which is mixed with the calibration signal, the power of the calibration signal being measured after the mixing with the reception reference signal and in which the reception circuitry comprises a filter, which acts on the calibration signal after it has been mixed with the reception reference signal, the filter having a passband; in which the method comprises adjusting gain and phase correction components of the reception circuitry, so as to reduce a negative frequency component corresponding to a component representing the reference signal which has been increased in frequency by the transmission local oscillator signal and decreased in frequency by the reception local oscillator signal;

d) in order to compensate for the presence of one of the components, the transmission circuitry is not coupled to the reception circuitry, no signal is applied to the input of the reception circuitry, so the measured power will be indicative of the presence of the one component; the variable to be modified will comprise the DC bias.

2. The method of claim 1, in which there is no determination of the distribution of the power over frequency.

3. The method of claim 1, in which the step of introducing the reference signal comprises introducing the reference signal at the input of the transmission circuitry.

4. The method of claim 1, in which the power of the calibration signal is measured at the output of the reception circuitry.

5. The method of claim 1, in which the transceiver circuit comprises a signal source arranged to generate the reference signal, and the step of introducing the reference signal comprises introducing the reference signal using the signal source.

6. The method of claim 1, in which the transmission circuitry comprises a transmission local oscillator arranged to produce a transmission local oscillator signal and a transmission mixer having inputs for the transmission local oscillator signal and the input signal and an output and being arranged to mix the signals at its input and output a mixed signal at its output, and in which the reception circuitry comprises a reception local oscillator arranged to produce a reception local oscillator signal and a reception mixer having inputs for the reception local oscillator signal and the modulated signal and an output and being arranged to mix the signals at its input and output a mixed signal at its output.

7. The method of claim 1, in which the step of adjusting the operation of the transmission and reception circuitry comprises configuring the circuit so that changing at least one variable of the transmission or reception circuitry causes at least one of the components to change in power relative to the other components, and then varying until an extreme, typically a minimum, in the measured power is reached.

8. The method of claim 1, in which the steps are carried out in an order of d), a), b), c).

9. The method of claim 6, in which the step of coupling the transmission circuitry to the reception circuitry comprises introducing the mixed signal output by the transmission mixer as the modulated signal of the reception circuitry.

10. The method of claim 6, in which the transceiver comprises a switch that selectively couples the mixed signal output by the transmission mixer to one of the inputs of the reception mixer.

11. The method of claim 10, comprising amplifying the mixed signal output by the transmission mixer before introducing it to the reception mixer, in which the amplification of the mixed signal output by the transmission mixer occurs in a low noise amplifier of the transmission circuitry, and in which the reception circuitry comprises a further low noise amplifier coupled to one of the inputs of the reception mixer, which is not used to amplify the mixed signal output from the transmission mixer.

12. A transceiver circuit, comprising transmission circuitry arranged to take at a transmitter input an input signal and to process the input signal so as to produce at a transmitter output an output signal comprising the input signal modulated onto a carrier signal; and reception circuitry arranged to take at a receiver input a modulated signal comprising a signal modulated onto a carrier signal and to output at a receiver output the signal demodulated from the carrier signal, in which the circuit further comprises:
 a switch arranged to selectively couple the transmission circuitry to the reception circuitry;
 a reference signal source arranged to introduce a reference signal into the transmission circuitry, the reference signal causing a plurality of components of different frequencies to be present in a calibration signal in the reception circuitry;
 power measurement circuitry arranged to measure the power of the calibration signal including the plurality of components; and
adjusting the operation of the transmission and reception circuitry so as to increase an amplitude of a first set of components comprising at least one of the plurality of components relative to an amplitude of a second set of the components comprising at least one of the plurality of components;
in which the circuit enters the following states:
a) a transmission local oscillator signal is set to a first frequency and the reception local oscillator signal is set to a second frequency less than the first frequency, the transmission circuitry being coupled to the reception circuitry and the reference signal is set to zero frequency;
b) the circuit comprises a transmission local oscillator signal set to a first frequency and a reception local oscillator signal set to a second frequency less than the first frequency, in which the transmission circuitry is coupled to the reception circuitry and the reference signal is set to a frequency greater than the difference between the frequencies of the transmission and reception local oscillator signals;
c) the reception circuitry comprises a signal generator arranged to generate a reception reference signal, which is mixed with the calibration signal, in which the power of the calibration signal is measured after the mixing with the reception reference signal and in which the reception circuitry comprises a filter, which acts on the calibration signal after it has been mixed with the reception reference signal, the filter having a passband;
d) in order to compensate for the presence of one of the components, the transmission circuitry is not coupled to the reception circuitry, no signal is applied to the input of the reception circuitry, so the measured Dower will be indicative of the presence of the one component; the variable to be modified will comprise the DC bias.

13. The circuit of claim 12, arranged such that the reference signal is introduced at the input of the transmission circuitry.

14. The circuit of claim 12, arranged such that the power of the calibration signal is measured at the output of the reception circuitry.

15. The circuit of claim 12, in which the signal source is a numerically controlled oscillator.

16. The circuit of claim 12, in which the transmission circuitry comprises a transmission local oscillator arranged to produce a transmission local oscillator signal and a transmission mixer having inputs for the transmission local oscillator signal and the input signal and an output and being arranged to mix the signals at its input and output a mixed signal at its output and in which the reception circuitry comprises a reception local oscillator arranged to produce a reception local oscillator signal and a reception mixer having inputs for the reception local oscillator signal and the modulated signal and an output and being arranged to mix the signals at its input and output a mixed signal at its output.

17. The circuit of claim 16, in which the reception circuitry comprises a signal generator arranged to generate a reception reference signal, which is mixed with the calibration signal, the power measurement circuitry being arranged so as to measure the power of the calibration after the mixing with the reception reference signal.

18. The circuit of claim 12, in which the circuit enter the states in the following order d), a), b) and c).

19. The circuit of claim 16, in which the switch selectively couples the mixed signal output by the transmission mixer to one of the inputs of the reception mixer.

20. The circuit of claim 16, in which the transmission circuitry comprises an amplifier arranged to amplify the mixed signal output by the transmission mixer before introducing it to the reception mixer.

21. The circuit of claim 17, in which the reception circuitry comprises a decimation filter, which acts on the calibration signal after it has been mixed with the reception reference signal, the decimation filter having a passband.

22. The circuit of claim 20, in which the reception circuitry comprises a further amplifier coupled to one of the inputs of the reception mixer, which is not used to amplify the mixed signal output from the transmission mixer.

* * * * *